United States Patent
Castro-Castro et al.

(10) Patent No.: US 9,294,902 B2
(45) Date of Patent: Mar. 22, 2016

(54) POLICY AND CHARGING CONTROL METHOD, SERVERS AND COMPUTER PROGRAMS THEREFOR

(75) Inventors: Fabian Castro-Castro, Madrid (ES); Ana Maria Lopez Nieto, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 614 days.

(21) Appl. No.: 13/126,554

(22) PCT Filed: Oct. 31, 2008

(86) PCT No.: PCT/EP2008/064793
§ 371 (c)(1),
(2), (4) Date: Apr. 28, 2011

(87) PCT Pub. No.: WO2010/049002
PCT Pub. Date: May 6, 2010

(65) Prior Publication Data
US 2011/0208853 A1  Aug. 25, 2011

(51) Int. Cl.
*G06F 15/173* (2006.01)
*H04W 4/24* (2009.01)
*H04L 12/14* (2006.01)
(Continued)

(52) U.S. Cl.
CPC ............. *H04W 4/24* (2013.01); *H04L 12/14* (2013.01); *H04L 41/0896* (2013.01); *H04L 41/5051* (2013.01); *H04M 15/66* (2013.01)

(58) Field of Classification Search
USPC ........... 709/203, 220–229; 370/229–235, 465
See application file for complete search history.

(56) References Cited

U.S. PATENT DOCUMENTS

| 7,895,145 B2 * | 2/2011 | Wang .............. H04L 63/102 706/45 |
| 7,907,524 B2 * | 3/2011 | Willars ............ H04L 12/5695 370/230 |

(Continued)

FOREIGN PATENT DOCUMENTS

| EP | 1 578 129 A1 | 9/2005 |
| EP | 1 721 427 B1 | 12/2008 |

(Continued)

OTHER PUBLICATIONS

3rd Generation Partnership Project Technical Specification Group Services and System Aspects, Policy and Charging Control Architecture, Mar. 2003, 3GPP TS 23.203 V8.1.1, Technical Specification XP-002541928, pp. 1-87.*

(Continued)

*Primary Examiner* — Joseph E Avellino
*Assistant Examiner* — Phyllis A Book

(57) ABSTRACT

A policy and charging control method includes creating by a policy and charging rules function (PCRF), first policy and charging control (PCC) rules at establishment of a user plane session associated with the UE. The first PCC rules are installed at a policy and charging enforcement function (PCEF) and the service is initiated in accordance with these rules. During the lifetime of the user plane session, a quality-of-service (QoS) change request is transmitted by the UE upon activation of a user interface command. The PCRF creates second PCC rules based on the request, and installs them at the PCEF by replacing the first PCC rules by the second PCC rules. The service is continued in accordance with the second PCC rules. PCRF and PCEF servers as well as computer programs are also defined.

10 Claims, 13 Drawing Sheets

(51) Int. Cl.
*H04M 15/00* (2006.01)
*H04L 12/24* (2006.01)

(56) References Cited

U.S. PATENT DOCUMENTS

| | | | | |
|---|---|---|---|---|
| 7,911,943 | B2* | 3/2011 | Rasanen | H04L 12/5695 370/229 |
| 8,027,296 | B2* | 9/2011 | Hu | H04L 12/14 370/329 |
| 8,086,216 | B2* | 12/2011 | Feder | H04L 12/14 455/405 |
| 8,131,831 | B1* | 3/2012 | Hu | H04M 15/43 379/201.03 |
| 8,175,576 | B2* | 5/2012 | Przybysz | H04M 15/00 455/406 |
| 8,249,551 | B2* | 8/2012 | Jones | H04L 63/20 455/406 |
| 8,355,325 | B2* | 1/2013 | Huang | H04W 4/20 370/230 |
| 2005/0094646 | A1 | 5/2005 | Lee | |
| 2006/0200545 | A1 | 9/2006 | Fromentoux et al. | |
| 2006/0222015 | A1 | 10/2006 | Kafka et al. | |
| 2006/0251234 | A1* | 11/2006 | Cooke | H04L 12/2829 379/221.07 |
| 2007/0070938 | A1 | 3/2007 | Hori | |
| 2007/0180052 | A1* | 8/2007 | Zomaya | G06F 8/64 709/217 |
| 2008/0046963 | A1* | 2/2008 | Grayson | H04L 67/322 726/1 |
| 2009/0010271 | A1* | 1/2009 | Bachmann | H04L 12/14 370/401 |
| 2009/0016344 | A1* | 1/2009 | Hu | H04L 47/41 370/389 |
| 2010/0115071 | A1* | 5/2010 | Sanchez Santiso | H04L 12/14 709/222 |
| 2010/0131647 | A1* | 5/2010 | Fernandez Alonso | H04L 63/102 709/225 |
| 2011/0022722 | A1* | 1/2011 | Castellanos Zamora | H04L 12/14 709/235 |
| 2011/0096749 | A1* | 4/2011 | Rune | H04W 76/022 370/331 |
| 2011/0128907 | A1* | 6/2011 | Kvernvik | H04L 12/5691 370/328 |
| 2011/0191482 | A1* | 8/2011 | Przybysz | H04L 12/14 709/228 |

FOREIGN PATENT DOCUMENTS

| | | | | |
|---|---|---|---|---|
| EP | 1721427 | B1 * | 12/2008 | H04L 12/5695 |
| GB | 2 380 900 | A | 4/2003 | |
| JP | H11-098147 | A | 4/1999 | |
| JP | 2007-081715 | A | 3/2007 | |
| JP | 2007-096522 | A | 4/2007 | |
| JP | 2007-189444 | A | 7/2007 | |

OTHER PUBLICATIONS

"3rd Generation Partnership Project; Technical Specification Group Services and System Aspects; Policy and charging control architecture (Release 8)" 3GPP, [Online] Mar. 2008, pp. 1-87, XP002541928 Retrieved from the Internet: (URL:http://www.3gpp.org/ftp/Specs/2008-03/Rel-8/23_series/23203-811 zip> [retrieved on Aug. 19, 2009].

"Telecommunications and Internet converged Services and Protocols for Advanced Networking (TISPAN): Requiremnts for QoS in a NGN: ETSI TS 181 018" ETSI Standards. Lis, Sophia Antipolis Cedex, France, vol. TISPAN, No. V2.0.0, Aug. 1, 2007, XP014040368 ISSN: 0000-0001.

Application Framework and Use cases Using TR-059 Architecture. DSL Forum, Architecture & Transport Working Group. Mar. 2, 2004.
Lucent Technologies. General Principles of QoS Control Policies for UMTS. 3GPP Draft, S2-000144. 3$^{rd}$ Generation Partnership Project (3GPP); vol. SA WG2. Jan. 21, 2000.

* cited by examiner

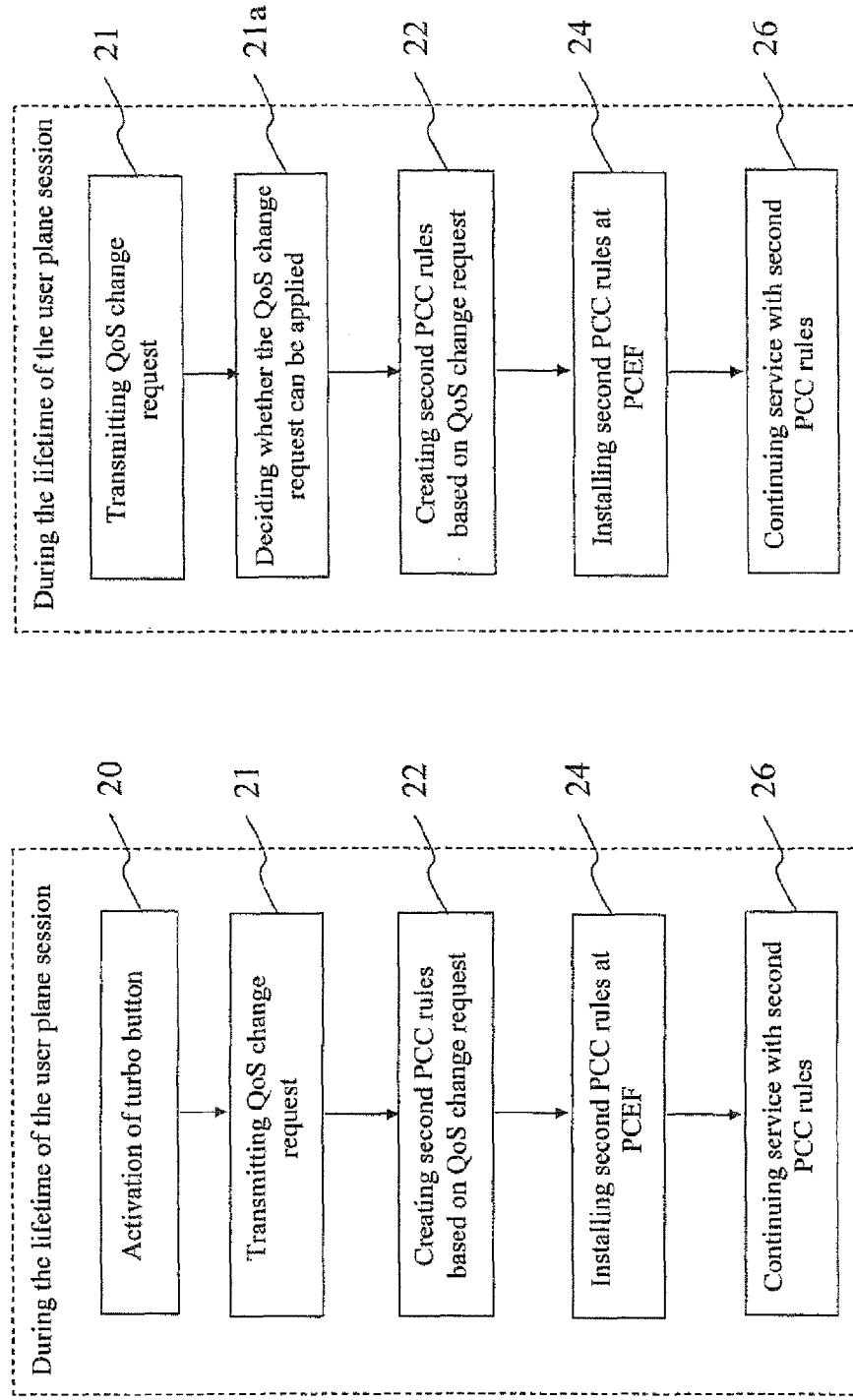

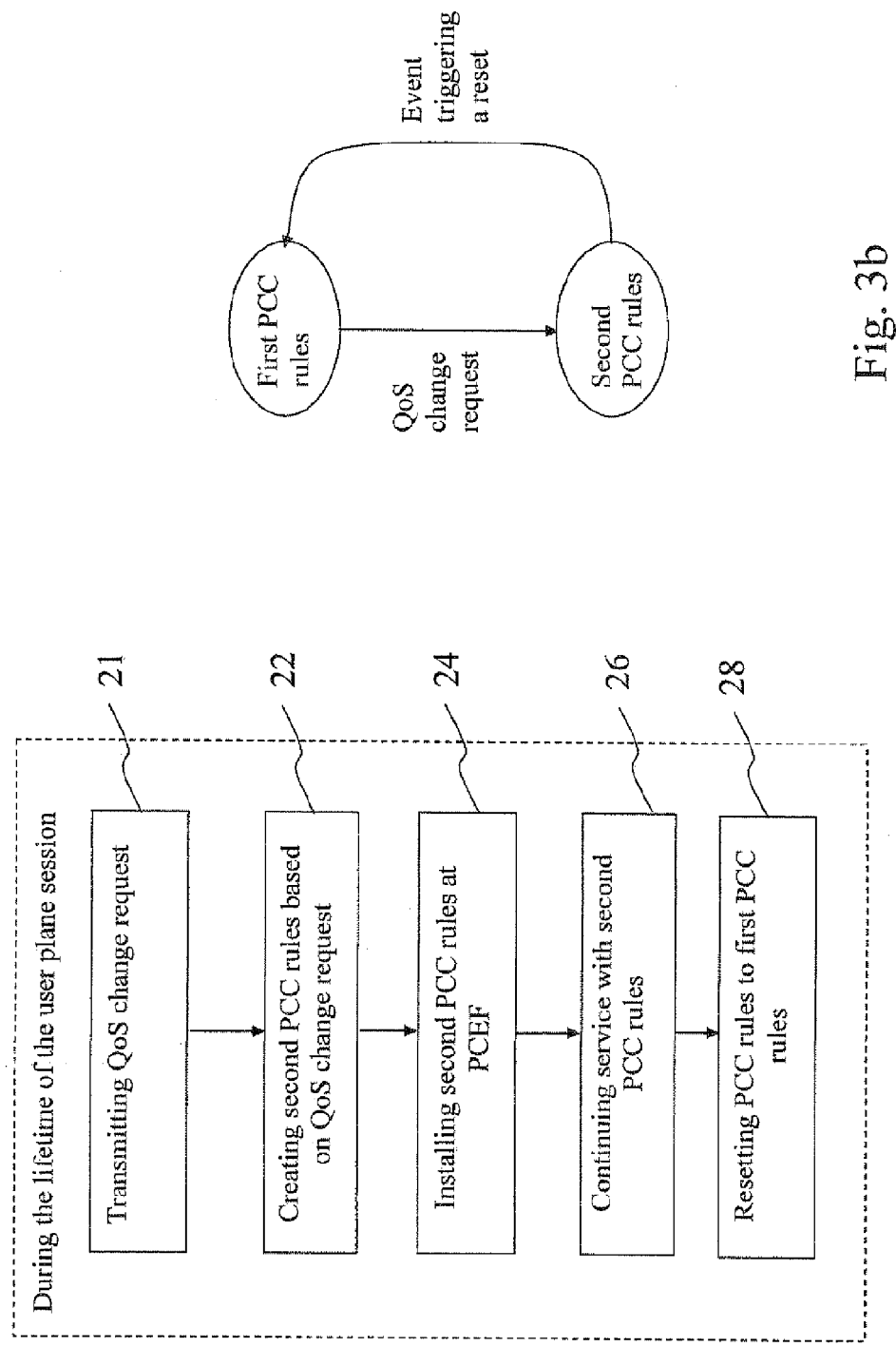

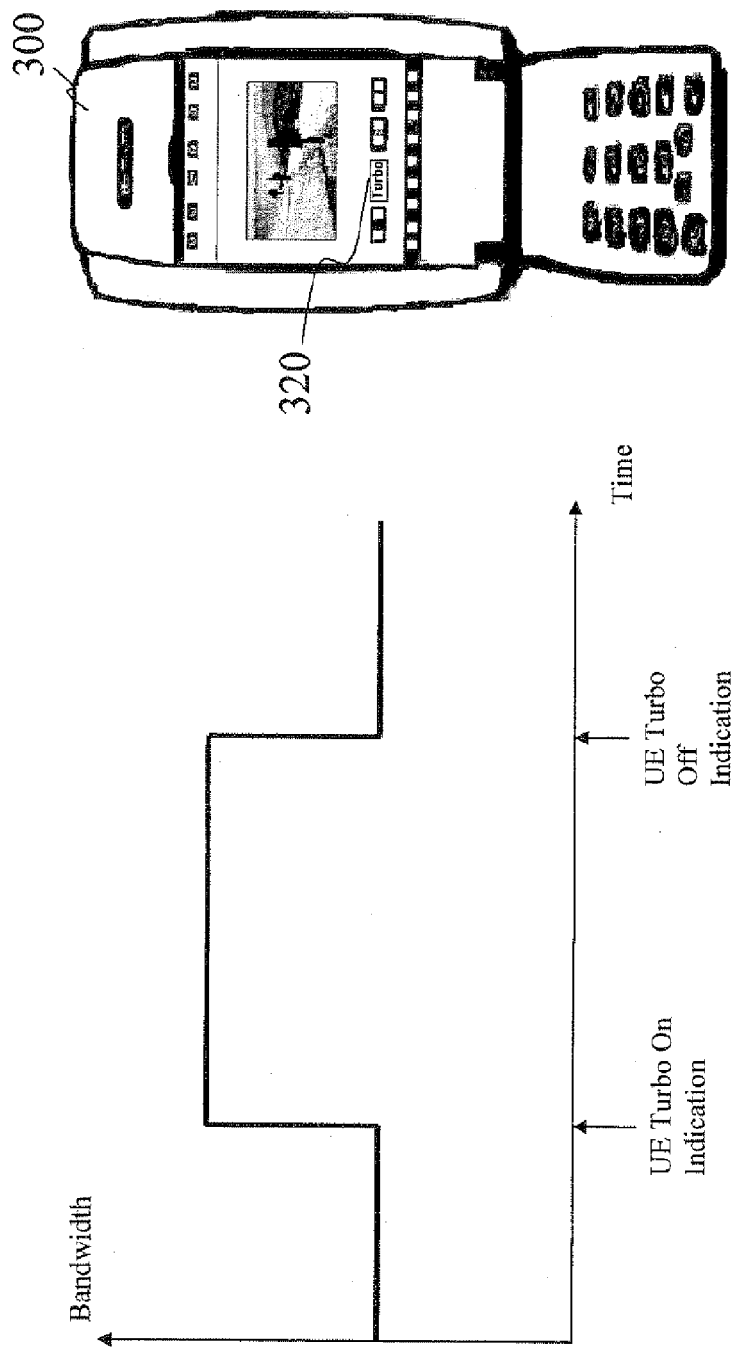

| Service | Normal Conditions ||||||| Turbo Conditions |||||||
| | GBR || MBR || QoS Class | Rating Group | GBR || MBR || QoS Class | Rating Group | Restrictions |
| | UL | DL | UL | DL | | | UL | DL | UL | DL | | | |
| Streaming | 25 | 50 | 75 | 125 | d | 2 | 50 | 75 | 100 | 150 | c | 1 | Turbo not allowed Radio Access Type <> UTRAN |
| WeShare | 25 | 50 | 75 | 125 | b | 3 | 50 | 75 | 100 | 150 | a | 2 | Turbo not allowed if Radio Access Type <> UTRAN and Roaming; Time Limit: 30 min |
| VoIP | 50 | 100 | 150 | 250 | b | 3 | 100 | 150 | 200 | 300 | a | 2 | Not allowed in any case |

Fig. 15

POLICY AND CHARGING CONTROL METHOD, SERVERS AND COMPUTER PROGRAMS THEREFOR

TECHNICAL FIELD

The present invention relates to a policy and charging control method carried out by a plurality of network nodes or servers. The invention also relates to a server implementing a policy and charging rules function (PCRF), to a server implementing a policy and charging enforcement function (PCEF), and to computer programs comprising instructions configured, when executed on a server, to cause the server to carry out policy and charging control procedures.

BACKGROUND

In communication networks, such as telecommunication networks, a call or a service often involves, on the one hand, a control plane or signalling plane and, on the other hand, a user plane. The control plane or signalling plane is in charge of establishing and managing a connection between two points on the network. The user plane or media plane is in charge of transporting the user data.

In this context, network operators often want to define and enforce a set of rules in the network. A set of rules constitutes policies. A policy framework for managing and enforcing these policies usually includes at least three elements, or functions: a policy repository for storing the policy rules which may be user-specific, a policy decision element, function or point, and a policy enforcement element, function or point. The purposes of a policy framework include controlling subscriber access to the networks and services.

A policy framework notably addresses the decisions as to whether the subscriber is entitled, or authorized, to enjoy a service, and whether the network can provide the service to the subscriber.

Policy and charging control architectures, such as, but not limited to, the architecture described in 3GPP TS 23.203 v8.1.1 (2008-03), Technical Specification Group Services and System Aspects, *Policy and charging control architecture (Release 8)* (available on http://www.3gpp.org/ftp/Specs/2008-03/Rel-8/23_series/), integrate the policy and charging control.

It is desirable to provide methods, servers and computer programs to improve policy and charging control architectures and implementations, notably by allowing more flexibility without increasing the implementation and architecture complexity.

SUMMARY

Such methods, servers and computer programs are defined in the independent claims. Advantageous embodiments are defined in the dependent claims.

In one embodiment, the method is a policy and charging control method carried out by a network node including, or implementing, an application function (AF), by a first server including, or implementing, a policy and charging rules function (PCRF), by a second server including, or implementing, a policy and charging enforcement function (PCEF), and by a user equipment (UE) configured to interact with the network node. The method includes the steps of creating, by the PCRF, first policy and charging control (PCC) rules based on session information negotiated between the UE and the AF; installing, at establishment of a user plane session associated with the UE, the first PCC rules at the PCEF; and initiating a service associated with the UE in accordance with the first PCC rules. The method further includes the steps of, during the lifetime of the user plane session; transmitting, by the UE to the network node, a quality-of-service (QoS) change request upon activation of a user interface command on the UE; creating, by the PCRF, second PCC rules based on the QoS change request; installing, at the PCEF, the second PCC rules by replacing the first FCC rules by the second PCC rules; and continuing the service associated with the UE in accordance with the second FCC rules.

The method provides means to change the QoS on demand. In one embodiment, the change may be a QoS increment. In another embodiment, it may be a QoS decrement. In one embodiment, the change may be temporary. In the context of, and based on, a FCC architecture, the method allows a user to subscribe to a service with a given QoS profile and then, at a certain point in time, to downgrade or upgrade, or more generally to change, the QoS profile at his or her request. The request may be made manually by the user or may be made according to settings stored on the UE, or user terminal, in response to a particular condition being met in the UE or following activation of a user interface command on the UE. In the method of the invention, the PCRF is implemented so as to be able to handle such QoS upgrade or downgrade request, or more generally such QoS change request, during the lifetime of the session.

A policy and charging control method is a method through which a network operator manages the rules to be applied to the users' sessions, or subscribers' sessions, regarding which use of the networks is allowed and which charging rule must be applied to a particular session on the user plane.

A PCRF is a policy decision element which, notably based on the user profile and on the network conditions, decides which rule has to be enforced in the user plane with respect to a particular session. In a General Packet Radio Service (GPRS) network for instance, the PCRF may be capable of communicating with the Gateway GPRS Support Node (GGSN) to transfer authorization information, so as to be able to control Internet Protocol (IP) bearer resources. The IP bearer enables the user plane transport of IP packets and is capable of carrying many IP flows.

A PCEF is in charge of enforcing the PCC rules decided by the PCRF. The PCEF enforces the PCC rules in the user plane with respect to a particular session.

An AF enables the PCRF to obtain application level session information, such as, but not limited to, service requirements, as input for the policy decision process. The AF is part of the control plane.

The term quality-of-service (QoS) refers to the collective effect of a set of requirements or policies implemented on a network by control mechanisms to ensure that goals relating to reliability, performance, integrity or other factors are met. The QoS may be used to determine or express the degree of satisfaction of a user of a service, such as a service consisting in transferring data packets over a network.

The control mechanisms set up to implement a QoS on a network are referred to in what follows as QoS mechanisms. QoS mechanisms may be implemented on a network and may be applied to data packets and their transfer over the network with the aim of ensuring a target QoS. The QoS mechanisms may be implemented on or applied to different protocol layers, for instance in the Open Systems Interconnection basic Reference Model (OSI model) or TCP/IP model. Depending on the protocol layer on which a QoS mechanism is implemented, the QoS mechanism may be implemented or enforced on some types of network nodes or network entities while not on others. In the present invention, the QoS is enforced by the PCEF, although this does not exclude that other networks node may also be in charge of some QoS mechanisms.

In some QoS mechanisms, the type of data packets or some of their characteristics need to be identified or recognized by a network node for properly implementing the QoS mechanism on the network. The identification of some information in the data packet or some information related to the data packet enables the application of different treatments or policies to different data packets. In other words, the handling of a data packet or group of data packets may be made dependent on the type or characteristics of the data packet or group of data packets.

For example, data packets representing voice may form one category of data packets in a given network and the data packets representing email messages may form another category of data packets in the network. Thus, in this example, by identifying what kind of information the data packets contain, or represent, different policies may be applied to the data packets representing voice compared to the data packets representing email messages.

In another example, data packets coming from a particular subscriber may form one category of data packets in a given network and the data packets coming from another subscriber may form another category of data packets in the network. Thus, in this example, by identifying the origin of the data packets, different policies may be applied to the data packets coming from the first subscriber in comparison to the data packets coming from the second subscriber.

In other words, the QoS-related treatment applied to data packets by network nodes may be different depending on the type of traffic, the content of the data packets, their origin, their destination or any other characteristics.

Examples of QoS mechanisms include:
Resource ReSerVation Protocol (RSVP), described in Braden, R., et al, "Resource ReSerVation protocol (RSVP)—Version 1 Functional Specification", RFC 2205, September 1997".
Diffserv, described in Blake, S., et al, "An Architecture for Differentiated Services", RFC 2475, December 1998, and Nichols, K., et al, "Definition of the Differentiated Services Field (DS Field) in the IPv4 and IPv6 Headers", RFC 2474, December 1998.

RSVP and Diffserv take action on Internet protocol (IP) packets. These two QoS mechanisms are implemented by routers or firewalls.

Another example of QoS mechanism is the one provided by Universal Mobile Telecommunications System (UMTS) bearer classes and described in 3GPP TS 23.107: "universal Mobile Telecommunications System (UMTS); Quality of Service (QoS) concept and architecture", V6.4.0, March 2006, where 3GPP means 3rd Generation Partnership Project and TS means Technical Specification. Bearer classes are defined, which each targets a specific type of data packet traffic.

In one embodiment, the activation of the user interface command on the UE is an activation of a turbo button. The activation is not however limited to a tactile user interface command such as the activation of a button, dial or switch. A voice command may also be used. After the activation of the user interface command, the user interface may indicate that the QoS change request has been accepted or not.

In one embodiment, the QoS change request is at least one of a request for a change in QoS category, level, calls or grade associated with the user plane session, a request for a change in the resources associated with the user plane session, such as a request for a change in the guaranteed bit rate associated with the user plane session, and such as a request for a change in the bandwidth associated with the user plane session.

In one embodiment, the method further includes, between the steps of transmitting the QoS change request and creating the second PCC rules based on the QoS change request, deciding at least one of: whether the QoS change request can be applied to the user plane session; and to which degree or extent the QoS change request can be applied to the user plane session. In this embodiment, the PCRF implementation is provided with means to determine and decide what QoS, or what additional QoS, is to be assigned in each case based on the service and user profile and whether it is possible to deliver the QoS, or additional QoS, based on the network conditions.

In one embodiment, the step of deciding includes deciding based on at least one of access network conditions, roaming conditions, radio access type, congestion level, time and user profile.

In one embodiment, the step of installing, at the PCEF, the second PCC rules by replacing the first PCC rules by the second PCC rules includes assigning a new charging key to the service associated with the UE. This embodiment enables to apply appropriate modified charging characteristics when a QoS change request is triggered by a user interface activation on the UE and when, subsequently, the second PCC rules are applied.

In one embodiment, the method further includes resetting the PCC rules applied to the user plane session back to the first PCC rules when at least one of the following occurs: a duration lapses or expires after the step of installing the second PCC rules at the PCEF; a request for resetting the QoS applied to the user plane session is transmitted from the UE; a particular time of the day or week is reached; a user profile with subscription data changes; and an event in the user plane invalidates the modified second PCC rules. In this context, an event may for instance be a condition being met in the user plane. In one embodiment, the event in the user plane that invalidates the second PCC rules includes that the UE is roaming. Setting an expiration time to the QoS change enables the network operator to restrict the possibly negative effects of the individual QoS changes on the overall network load request. This may also be an incentive for the users to request the QoS change only when necessary.

In one embodiment, the PCEF is implemented in at least one of a gateway, a PCEF unit, a gateway general packet radio service (GPRS) support node (GGSN), and a packet data gateway (PDG). Other implementations for the PCEF are also within the scope of the invention.

In one embodiment, the QoS change request is transmitted from the UE to the network node through a session negotiation protocol request being any one of a real time streaming protocol (RTSP) setup request; and a session initiation protocol (SIP) request. Other types of QoS change requests using the same or different communication protocols are also within the scope of the invention.

The invention also relates to a server configured for implementing a policy and charging rules function and to a server configured for implementing a policy and charging enforcement function, as defined in the claims. The servers are configured to participate in the above-described methods, and their particular embodiments.

The invention also relates to a computer program including instructions configured, when executed on a server configured for implementing a PCRF, to cause the server to carry out the above-described steps relating to the PCRF. The invention also relates to a computer program including instructions configured, when executed on a server configured for implementing a PCEF, to cause the server to carry out the above-described steps relating to the PCEF. The computer programs are defined in the claims. However, any embodiments and variants discussed with reference to the methods and servers according to the invention and their embodiments are also applicable to the computer programs, and are within the scope of the invention.

The invention also relates to a UE configured, arranged or adapted to cooperate or interact with the above-described servers to carry out any one of the above-described methods and their embodiments.

BRIEF DESCRIPTION OF THE DRAWINGS

Embodiments of the present invention shall now be described, in conjunction with the appended figures, in which:

FIGS. 2a and 2b illustrate flow charts of portions of methods according to embodiments of the invention, with respectively a step of activating a turbo button (FIG. 2a) and a step of deciding whether a QoS change request can be applied (FIG. 2b);

FIG. 3a illustrates a flow chart of a portion of a method according to an embodiment of the invention, with a step of resetting PCC rules;

FIG. 3b illustrates a state diagram corresponding to a method according to an embodiment of the invention, notably illustrating a PCC rules resetting;

FIG. 8a schematically illustrates the increase of bandwidth allocated to a service associated with a UE in a method according to an embodiment of the invention;

FIG. 8b schematically illustrates a user interface button, and more specifically a turbo button, arranged on a UE, in one embodiment of the invention;

FIG. 15 illustrates exemplary QoS profiles assigned to different services before and when the second PCC rules are activated (corresponding for instance to the activation of the so-called turbo feature), according to an embodiment of the invention.

DETAILED DESCRIPTION

The present invention shall now be described in conjunction with specific embodiments. It may be noted that these specific embodiments serve to provide the skilled person with a better understanding, but are not intended to in any way restrict the scope of the invention, which is defined by the appended claims.

Figure 1:
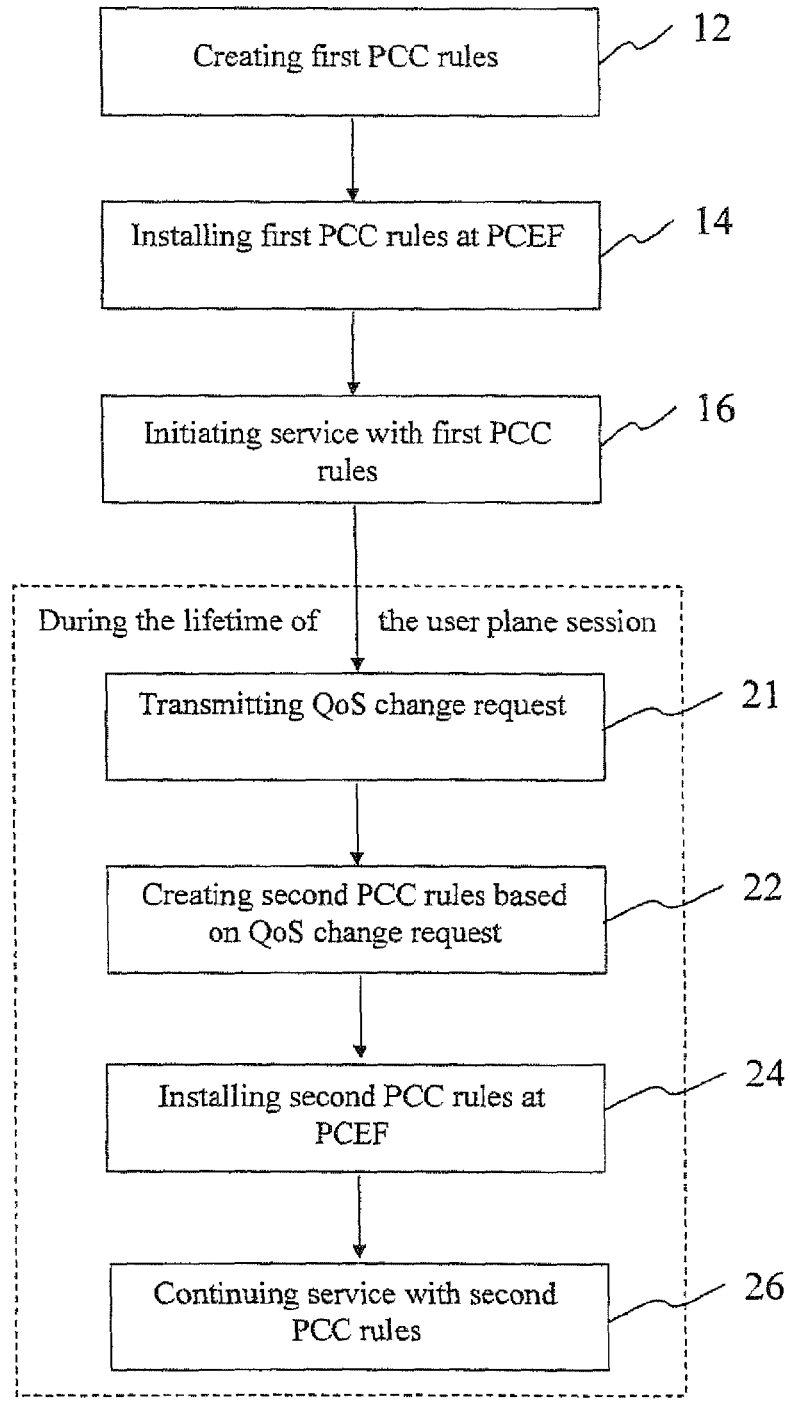
FIG. 1 illustrates a flow chart of a method according to an embodiment of the invention.

FIG. 1 schematically illustrates a flow chart of a policy and charging control method in one embodiment of the invention. The illustrated policy and charging control method is carried out by a network node including, or implementing, an AF 400 (not illustrated in FIG. 1), by a first server including, or implementing, a PCRF 100, by a second server including, or implementing, a PCEF 200, and by a UE 300. The UE 300 is configured to interact with the network node.

After negotiation between the UE 300 and the AF 400, which leads to the establishment of negotiated session information, the PCRF creates 12 first PCC rules based on the session information. Then, at the establishment of a user plane session associated with the UE 300, the first PCC rules are installed 14 at the PCEF 200. The service is then initiated 16 in accordance with the first PCC rules. In other words, the service is initiated 16 in such a manner that the PCEF 200 enforces the first PCC rules for the initiated service.

Subsequently, at one point in time during the lifetime of the user plane session (in FIG. 1, the steps occurring during the lifetime of the user plane session are included in the dotted rectangle), a user interface command is activated on the UE 300. This triggers the transmission 21, from the UE 300 to the network node, and then from the latter to the PCRF, of a QoS change request. In particular, the transmission may be carried out from the AF in the network node to the PCRF. This may correspond to a request, originating from the user of the UE 300, to obtain a temporary increase in bandwidth associated with a particular service.

Upon reception of the QoS change request at the PCRF 100, the PCRF 100 creates 22 second PCC rules to handle, insofar as possible, the QoS change request. As it will be explained later, the creation of the second PCC rules may be subject to checking whether the UE 300, or UE's user, is authorized, at a particular time, in a particular network and with respect to a particular service, to obtain the requested QoS change, such as the requested QoS increase. The creation of the second PCC rules may also be subject to checking whether the current network conditions allow the QoS change. In other words, whether the network can afford, at a particular point in time, the QoS increase with respect to the particular service associated with the UE 300 may need to be checked.

Once the PCRF 100 has created the second PCC rules, subject to the optional above-described checks, the second PCC rules are installed 24 at the PCEF 200 by replacing the first PCC rules by the second PCC rules.

Here, the references to the first and second PCC rules should be understood as follows. The first PCC rules created and installed at the establishment, i.e. at the initiation, of the user plane session are replaced later, during the lifetime of the user plane session, by the second PCC rules. However, still during the lifetime of the user plane session and following a second QoS change request, the second PCC rules may in turn be replaced by third PCC rules (not illustrated), etc. The creation of subsequent PCC rules may result from subsequent QoS change requests corresponding to the desire, by the UE's user, to obtain yet a further QoS change, such as yet a further QoS increase, in relation to a particular service or session.

After installation 24 of the second PCC rules at the PCEF 200, the service associated with the UE 300 is carried on, i.e. continued 26, in accordance with these second PCC rules. At this point, the PCEF 200 enforces the second PCC rules at least during a certain period. The QoS change may be a change in bandwidth or bit rate associated with a session.

FIG. 2a schematically illustrates the steps occurring during the lifetime of the user plane session in the method of FIG. 1, but with an additional step of activating 20 a turbo button, or more generally activation of user interface command indicating the desire to obtain a QoS change, such as a QoS increase. The additional step 20 takes place before transmitting 21 a QoS change request from the UE 300 to the network node. The step of activating 20 a turbo button is a specific case of the more general case of activating a user interface command on the user equipment. Both the specific and more general cases are within the scope of the invention. An example of turbo button is illustrated in FIG. 8b.

FIG. 2b schematically illustrates the steps occurring during the lifetime of the user plane session in the method of FIG. 1, but with an additional step of deciding 21a whether the QoS change request can be applied. The step of deciding 21a occurs between transmitting 21 the QoS change request to the network node and creating 22 second PCC rules based on the QoS change request.

In one embodiment, deciding 21a whether the QoS change request can be applied leads to two different results: (i) the QoS change request can be applied so that the second PCC rules are created 22 based on the QoS change request, or (ii) the QoS change request cannot be applied so that second PCC rules are not created 22. In the latter case (ii), the PCEF 200 continues to apply the first PCC rules, and optionally the UE 300 may be informed that the QoS change request cannot be applied. Optionally, the UE 300 may also be informed of the reason why the QoS change request cannot be applied. The reasons may include at least one of a lack of authorization by the user associated with the UE 300 to obtain the QoS change, and a lack of capability by the network node (i.e. by the network node user plane) to apply the QoS change request due to the current network conditions.

In another embodiment, deciding 21a whether the QoS change request can be applied may lead in more than two different determinations: (i) the QoS change request can be applied (as explained above), (ii) the QoS change request cannot be applied (as also explained above), or (iii) the QoS change request can be applied to a certain extent or degree only. The third case (iii) may apply because the user lacks the necessary authorization to obtain the requested QoS change in full, while that the user is however authorized to obtain QoS change to a certain extent. In other words, the QoS change requested by the user can be partially satisfied. The third case (iii) may also apply because the current network conditions allow only to partially satisfying the desire of the UE or UE's user.

FIG. 3a schematically illustrates the steps occurring during the lifetime of the user plane session in the method of FIG. 1, but with an additional step of resetting 28 the PCC rules to the first PCC rules. In other words, in one embodiment, during the lifetime of the user plane session, applying second PCC rules at the PCEF 200 is a temporary operation.

In one embodiment, resetting 28 the PCC rules applied to the user plane session back to the first PCC rules occurs when a duration lapses or expires after installation 24 of the second PCC rules.

In one embodiment, resetting 28 occurs when a request for resetting the QoS applied to the user plane session is transmitted from the UE 300. Such request for resetting the QoS applied to the user plane session may be transmitted from the UE 300 upon activation of a user interface command. The activation of the user interface command may include, or consist in, pressing again a turbo button.

In one embodiment, resetting 28 of PCC rules takes place when a particular time of the day, week, month or year is reached.

In one embodiment, resetting 28 occurs when a user profile with subscription data for the user, changes.

In one embodiment, resetting 28 occurs when an event in the user plane invalidates the second PCC rules. This may occur when it is detected that the UE 300 is roaming. This may additionally or alternatively occur when the amount to be charged to a user having requested the QoS change has reached a threshold.

The above embodiments and conditions for resetting 28 PCC rules do not constitute an exhaustive list. Other, alternative or additional, conditions may be used.

FIG. 3b illustrates a basic state diagram highlighting the change from the first PCC rules enforced by the PCEF 200 to the second PCC rules upon reception of a QoS change request, and switching back from the second PCC rules to the first rules when a condition is met, such as, as explained above, the occurrence of an event configured to trigger a reset.

The embodiments illustrated with reference to FIGS. 2a, 2b, 3a and 3b may be combined in accordance to any combination thereof.

Figure 4B:
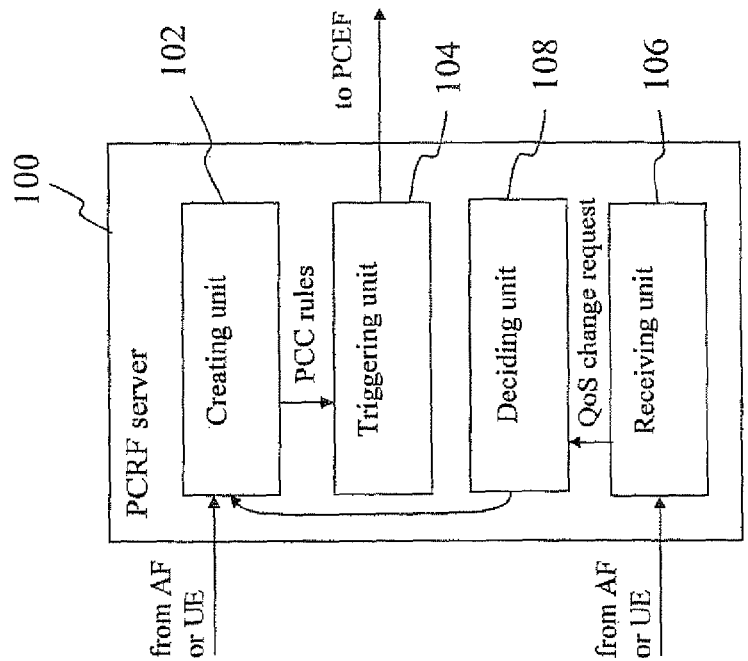
FIGS. 4a and 4b schematically illustrate two PCRF servers according to embodiments of the invention.
Figure 4A:
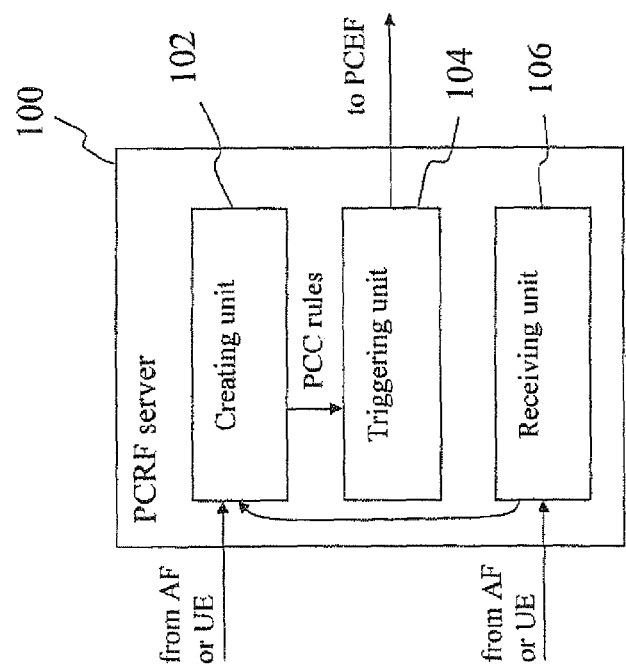

FIG. 4a schematically illustrates a server configured for implementing a PCRF. The server is herein referred to as a PCRF server 100. The PCRF server 100 includes a creating unit 102, a triggering unit 104 and a receiving unit 106.

The creating unit 102 is configured for creating first PCC rules based on session information negotiated a UE 300 and an AF 400. The creating unit 102 is therefore configured to receive input from an AF 400 or a UE 300. The creating unit 102 is also configured to output the first PCC rules to the triggering unit 104. The creating unit 102 is further configured for creating, during the lifetime of the user plane session, second PCC rules based on a QoS change request transmitted from the receiving unit 106. The creating unit 102 is therefore configured to receive input from the receiving unit 106. The creating unit 102 is also configured to output the created second PCC rules to the triggering unit 104.

The triggering unit 104 is configured for triggering the installation, at establishment of a user plane session associated with the UE 300, of the first PCC rules at the PCEF server 200. As a result, the PCEF 200 can enforce the first PCC rules upon initiating a service associated with the UE 300 or UE's user. The triggering unit 104 is further configured for triggering the installation, during the lifetime of the user plane session, of the second PCC rules at the PCEF server 200, by replacing therein the first PCC rules by the second PCC rules. The PCEF server 200 can therefore continue the service associated with the UE 300 or UE's user in accordance with the second PCC rules, i.e. by enforcing the second PCC rules rather than the first PCC rules.

The receiving unit 106 is configured for receiving, during the lifetime of the user plane session, a QoS change request from a UE 300, directly or through an AF 400. The receiving unit 106 outputs the QoS change request to the creating unit 102.

FIG. 4b schematically illustrates a PCRF server which comprises the units described with reference to FIG. 4a, with an additional deciding unit 108. The deciding unit 108 is configured for deciding whether the QoS change request can be applied to the user plane session, or to which degree or extent the QoS change request can be applied to the user plane session. The deciding unit 108 is further configured for receiving, from the receiving unit 106, as an input, the QoS change request. The deciding unit 108 is configured for outputting the QoS change request to the creating unit 102, if it is determined that the QoS change request can be applied to the user plane session. The deciding unit 108 is also configured to output, when appropriate or necessary, information as to which degree or extent the QoS change request can be applied to the user plane session.

Figure 5B:
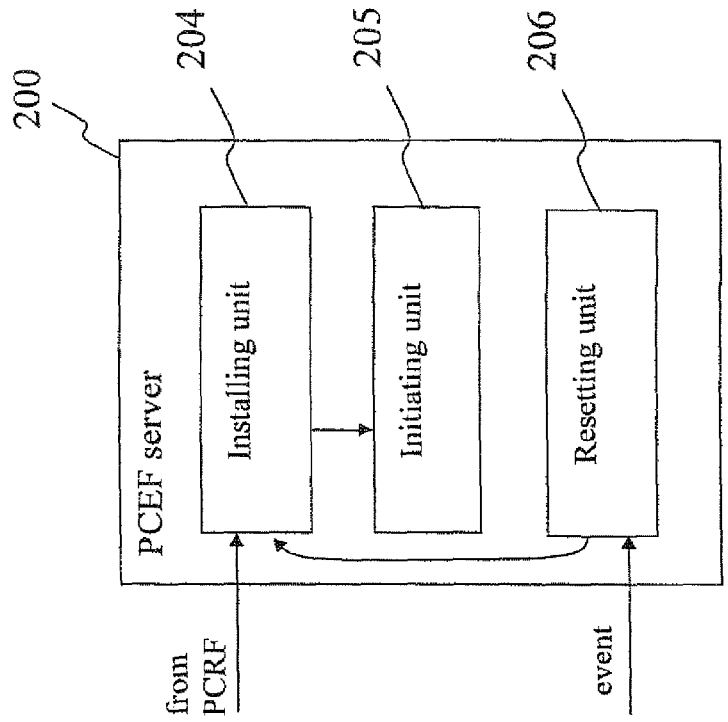
FIGS. 5a and 5b schematically illustrate two PCEF servers according to embodiments of the invention.
Figure 5A:
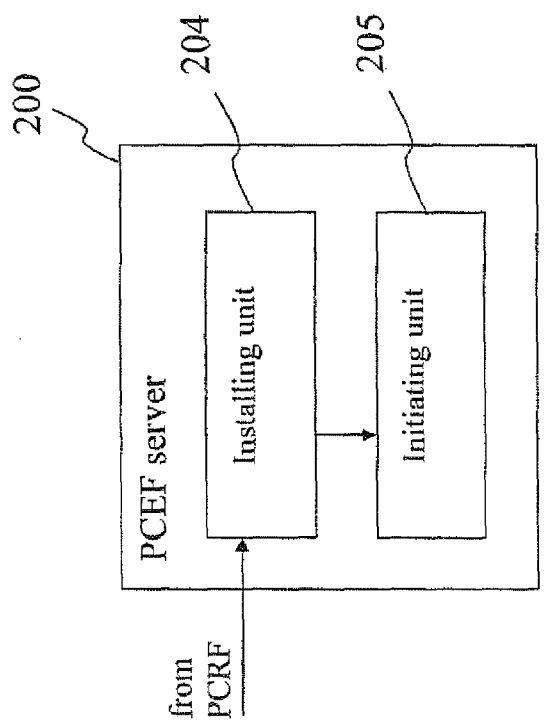

FIG. 5a schematically illustrates a server implementing a PCEF, herein referred to as a PCEF server 200. The PCEF server 200 includes an installing unit 204 and an initiating unit 205.

The installing unit 204 is configured for installing, at establishment of a user plane session associated with the UE 300 or UE's user, first PCC rules after receiving them from the PCRF server 100. The installing unit 204 is further configured, during the lifetime of the user plane session, to install second PCC rules by replacing the first PCC rules by the second PCC rules after receiving the second PCC rules from the PCRF server 100. The installing unit 200 is further configured to continue, or to cause to continue, a service associated with the UE 300, or UE's user, in accordance with the second PCC rules.

The initiating unit 205 is configured for initiating a service associated with the UE 300 in accordance with the first PCC rules.

FIG. 5b schematically illustrates a PCEF server 200, which comprises the units described with reference to FIG. 5a, with an additional resetting unit 206. The resetting unit 206 is configured for resetting the PCC rules applied to the user plane session back to the first PCC rules when a condition is met, as described above.

In one embodiment, the PCRF server 100 (or first server) and the PCEF server 200 (or second server) form a unique server. In another embodiment, the PCRF server 100 (or first server) and the PCEF server 200 (or second server) form two distinct servers. In one embodiment, the PCRF server 100 (or first server) and the AF 400 form a unique server or network node. In another embodiment, the PCRF server 100 (or first server) and the AF 400 form separate servers or network nodes.

In one embodiment, the AF 400, PCRF 100, and PCEF 200 are located in separate network nodes (or servers) wherein the AF 400 communicates with the PCRF 100 and the latter with the PCEF 200. A PCRF 100 may be capable of communicating with a plurality of AFs 400 and with a plurality of PCEFs 200 in a network, and one PCRF 100 may serve and handle the plurality of AFs 400 and PCEFs 200.

Figure 6:
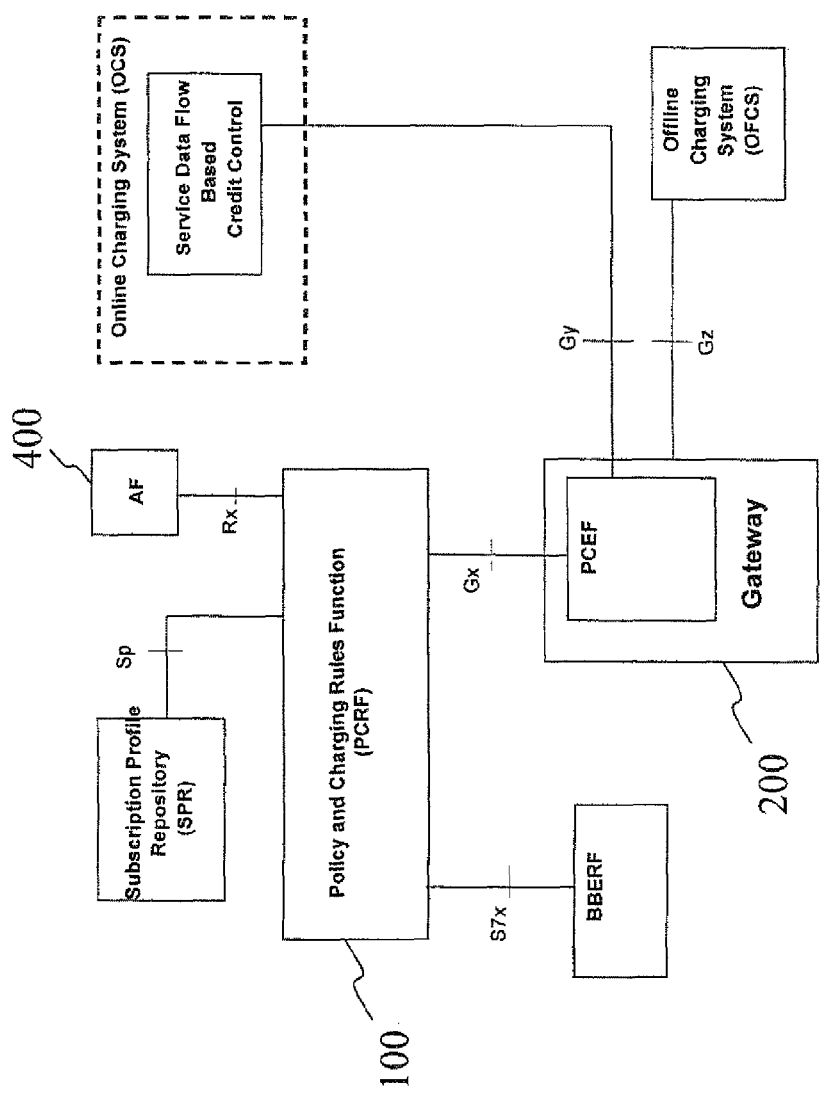
FIG. 6 schematically illustrates an exemplary PCC architecture in a non-roaming situation, to assist the reader in understanding an exemplary context wherein embodiments of the invention may be applied.

FIG. 6 schematically illustrates an exemplary PCC architecture in a non-roaming situation, to assist the reader in understanding an exemplary context wherein embodiments of the invention may be applied. In particular, the exemplary PCC architecture enables to integrate both policy and charging control, with the aim optimizing the information flow. More details of the architecture can be found in Ts 23.203 (V.8.1.1) (already referred to above) that specifies the PCC functionality for evolved 3GPP packet switched domain, including both 3GPP accesses (GERAN/UTRAN/E-UTRAN) and non-3GPP accesses. The subscription profile repository (SPR), the AF and the PCRF are notably discussed herein.

The AF 400 is an element offering applications in which service is delivered in a different layer (e.g. transport layer) from the one the service has been requested (e.g. signalling layer), the control of resources such as, but not limited to, IP bearer resources, according to what has been negotiated. One example of a network node including an AF 400 is the P-CSCF (proxy-call session control function) of the (3GPP) IP multimedia (IM) core network (CN) subsystem. The AF 400 communicates with the PCRF 100 to transfer dynamic session information (i.e. description of the media to be delivered in the transport layer). This communication is performed using the Rx interface or Rx reference point, which lies between the PCRF 100 and the AF 400 and is used to exchange application level information between the PCRF 100 and AF 400. The information in the Rx interface is derived from the session information in the P-CSCF (e.g. SDP when SIP is used for signaling) and it mainly includes what is called media components. A media component is composed by a set of IP flows, each one described through a 5-tuple, the media type and bandwidth required. Another example of a network node including an AF 400 is a streaming server, which is further exemplarily discussed in this specification.

The PCRF 100 is the function that provides policy and charging control for the media components negotiated between the UE 300 and the AF 400. To do so, the PCRF 100 creates PCC rules based on the information received from the Rx interface. The PCRF 100, depending on the user and the requested service, includes charging and policy information along with a set of IP filter information: each IP 5-tuple is composed of source and destination IP address and ports, and the protocol id above IP (TCP, UDP). The filters included in PCC rules define the so-called service data flows (SDF), i.e. data flows that are treated in the same way regarding policy and charging. These SDF are installed in PCEF 200 through the Gx interface (as illustrated in FIG. 6).

The PCEF 200 encompasses service data flow detection (based on the filters definitions included in the PCC rules), as well as online and offline charging interactions (not described here) and policy enforcement. The PCEF 200 enforces the QoS for the bearer, i.e. on the user plane, according to the QoS information obtained or received from the PCRF 100. This functional entity is located at the gateway (e.g. GGSN in the GPRS case, and PDG in the WLAN case).

The SPR contains information about the subscriber and its policies. If a user is a "Gold" subscriber and is permanently able to have more bandwidth than the average user, this information will be inserted in the SPR.

In the PCC architecture, the policy control includes the QoS control. The PCEF 200 enforces the authorized QoS for an IP connectivity access network (IP-CAN) bearer according to the information received via the Gx interface and depending on the bearer establishment mode.

The enforcement of the authorized QoS of the IP-CAN bearer may lead to a downgrading or upgrading of the requested bearer QoS by the PCEF 200 as part of a UE-initiated IP-CAN bearer establishment or modification. Alternatively, the enforcement of the authorised QoS may, depending on operator policy and network capabilities, lead to network initiated IP-CAN bearer establishment or modification. If the PCRF 100 provides authorized QoS for both, the IP-CAN bearer and PCC rule(s), the enforcement of authorized QoS of the individual PCC rules takes place first.

For policy control, the AF 400 interacts with the PCRF 100 and the PCRF 100 interacts with the PCEF 200 as instructed by the AF 400. For certain events related to policy control, the AF 400 gives instructions to the PCRF 100 to act on its own, i.e. based on the service information currently available.

Figure 7:
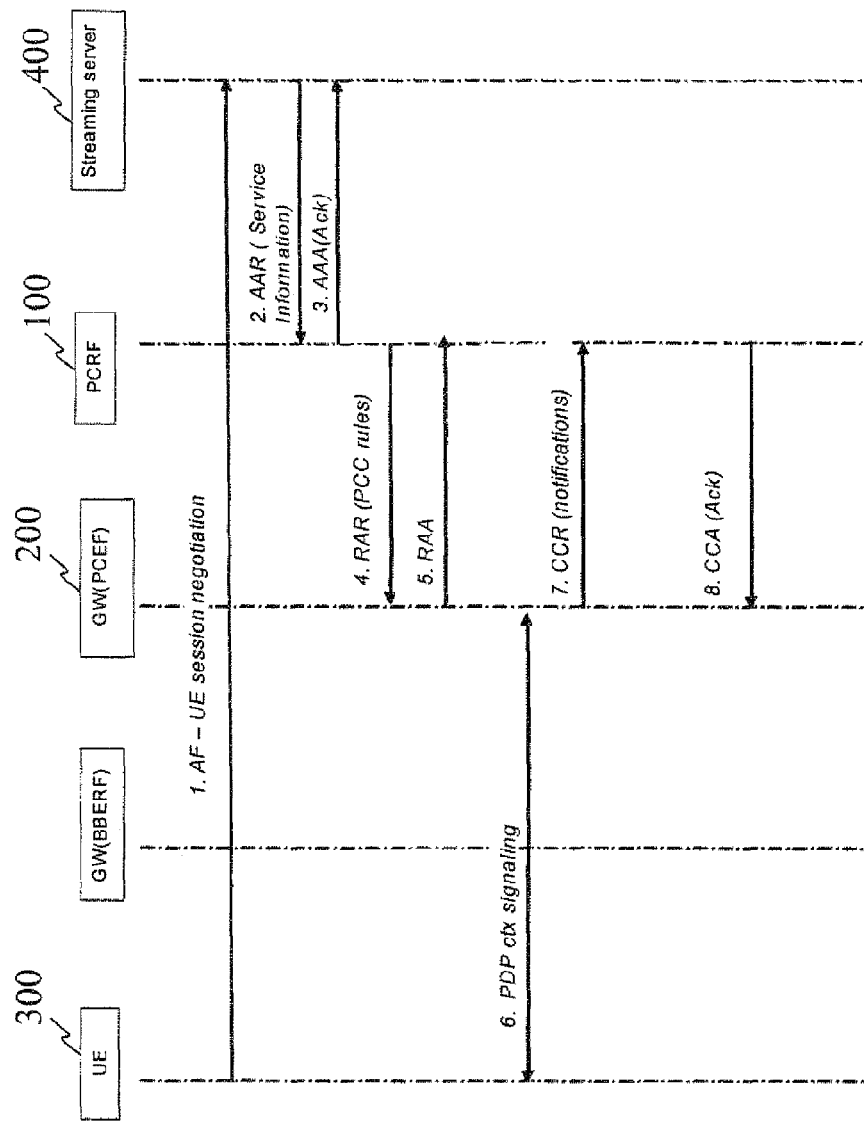
FIG. 7 illustrates an exemplary procedure involving an access to a streaming server, to assist the reader in understanding an exemplary context wherein embodiments of the invention may be applied.

FIG. 7 illustrates an exemplary procedure involving an access to a streaming server, to assist the reader in understanding an exemplary context wherein embodiments of the invention may be applied.

The UE 300 connects to a streaming server 400 and negotiates the session (step "1. AF-UE session negotiation"). During the session negotiation, the IP ports used by the end points, the type of media (audio, video, etc.) and the QoS parameters are defined.

The streaming server 400 provides the session information that has been negotiated to the PCRF 100 (step "2. AAR (Service Information)", wherein AAR is a command code in the Diameter header).

The PCRF 100 checks whether the received session information complies with the operator-defined policies, stores the service information and responds with an acknowledgement to the application server 400, i.e. the streaming server in this example (step "3. AAA (Ack)").

The PCRF 100 sends a RAR request to request that the GW, including the PCEF 200, or GW (PCEF), installs, modifies or removes PCC rules (step "4. RAR (PCC rules)").

The GW, including the PCEF 200, sends an RAA to acknowledge the RAR (step "5. RAA").

The GW (BBERF), wherein BBERF stands for bearer, binding and event reporting function, initiates the procedure to create or update the packet data protocol (PDP) context (ctx) request message (step "6. PDP ctx signaling").

The GW (PCEF) 200 then sends the required notifications to the PCRF 100 (step "7. CCR notifications" wherein CCR stands for Credit-Control-Request and is a command code in the Diameter header—see RFC 4006, *Diameter Credit-Control Application*, August 2005).

The PCRF 100 stores the information received in the notification and acknowledges the CCR with a CCA (step "8. CCA (Ack)" wherein CCA stands for Credit-Control-Answer and is a command code in the Diameter header—see RFC 4006).

In the system illustrated in FIG. 6 and in the exemplary procedure illustrated in FIG. 7, a user may have certain QoS limits pre-established in the context of his or her subscription. For example, a user may have a subscription of 128 kb/s (kilobytes per second). Also, the user may have different QoS profiles per each service to which he or she has subscribed, for example 1 Mb/s (megabyte per second) for peer-to-peer file sharing services and 128 kb/s for the other services. The PCRF 100 takes into account this subscription information amongst other information received from the AF 400 and the PCEF 200 to determine the QoS authorization information to be dynamically provisioned in the PCEF 200.

This solution (i.e. the solution illustrated with reference to FIGS. 6 and 7) does not allow the user, on the one hand, to subscribe to a grade of service (for example to the basic and cheapest one), and, then, on the other hand, to change (such as to increment) the QoS for a specific service only when the user wants to do so. This may happen, for example, when the subscriber is watching a movie, or any other application, that requires more bandwidth or a more adapted QoS.

The bandwidth-on-demand means that, at any time, the user from his or her terminal, or UE 300, may indicate that he or she temporarily needs or wishes to increment the quality of his or her connection, as illustrated in FIG. 8*a*. That feature may be called the "turbo button" or "turbo" feature of one embodiment of the invention: the subscriber presses a button to request the network to temporarily increment the network resources allocated to him or her, as illustrated in FIG. 8*b*.

The word "turbo" and the expression "turbo button" are not intended to limit the invention and are mere exemplary names for a feature consisting in allowing a user, or subscriber, to request a change in QoS by activating a user interface command on the UE 300.

A difference between this bandwidth-on-demand feature, of an embodiment of the invention, and other solutions such as the modification of the user profile by a provisioning system is that the bandwidth-on-demand feature may have a temporary nature. In the bandwidth-on-demand feature, the change of bandwidth assigned to a user, may have a validity time limit.

The time limit may be configurable or may depend on an explicit indication, by the user, of the end of the period of allocation of additional bandwidth or changed QoS.

One embodiment of the invention may be regarded as a modification to the PCC architecture, implementation and procedure illustrated with reference to FIGS. 6 and 7. The embodiment provides a turbo button solution to allow the user to temporarily improve the QoS of his or her connection or the QoS assigned to a specific service.

This embodiment includes the use of the Rx interface as standardized in the PCC architecture (see FIG. 6) to convey the information to indicate that a user temporarily wants to change, or increment, the QoS associated with his or her session. This embodiment notably includes the transfer of particular, enhanced information from the AF 400 to the PCRF 100 over the Rx interface or Rx reference point.

This embodiment notably involves the UE 300 from which an indication of turbo button activation is capable of being transferred to the network node, and then to the PCRF 100, wherein the service session and media component information (service data flow information) analysis needs to take into account the turbo indication. The embodiment may also involve the AF 400, if used, which is required to create enhanced service session information and media component information (service data flow information). This embodiment impacts the Rx interface, wherein the session description contains information to indicate the QoS change request, or turbo request. This information may also contain an indication of different levels of QoS changes, or different levels of turbo.

In one embodiment of the invention, the SPR contains information indicating that a user is authorized to request more bandwidth, on demand.

The PCRF 100, upon the reception of the QoS change request, for instance a turbo petition, evaluates whether the request can be executed, i.e. enforced at the PCEF 200, considering information such as:

(1) User subscription: The user profile indicates if the user has the turbo feature available. The user profile may also have a mapping to the bandwidth increment that supposes this turbo action. The bandwidth increments may be different per user and per service.

(2) Traffic information: The information received from the PCEF 200 through the Gx interface is considered in the evaluation, for example the radio access type (RAT), roaming indication, etc, since the turbo execution may have some restrictions depending on the network circumstances. For example, the increment may be a certain value if the RAT type is UTRAN, and another value if the RAT type is GERAN or it may not be possible in case of roaming. These restrictions are configurable and part of the policy evaluation process to be executed in the PCRF 100.

(3) Policies: The PCRF 100 has policies to decide if the turbo action is possible, and to determine what actions are to be taken in that case, such as the increment of bandwidth to be indicated to the PCEF 200 as part of the second PCC rules. The increment may be different depending on the information referred to in points (1) and (2) above.

This embodiment may be described in other words as follows:

A user first establishes an AF session. The PCRF 100 receives the session establish request and installs the corresponding PCC rules at the PCEF 200. Each PCC rule includes a SDF and policy and charging data. These data allows the PCEF 200 to perform traffic classification and policy enforcement.

During the lifetime of the session, the user requests the change or improvement of the session QoS through the use of the turbo feature. At this point in time, the PCRF 100 receives an AF session modification with the turbo indication and possibly the level, degree or extent of the QoS change request. It analyzes the allowability and viability of the request and creates the corresponding PCC rules. The new PCC rules, i.e. the second PCC rules, have assigned improved QoS values compared with the PCC rules installed in the session creation: better QoS class and/or higher bit rates. As part of the PCC rule definition, the charging key which is used by the online charging system (OCS) and offline charging system (OFCS) to determine the tariff to apply to the SDF is also indicated. The PCRF 100 may assign a different charging key in the new PCC rules so that an adapted charging may be applied to take into account the QoS change, or turbo usage.

A skilled person will find information about a possible PCC structure in TS 23.203 (referred to above) as a background technical information to carry out the invention, although the invention is not limited to the improvement of the architecture described in TS 23.203.

Figure 9:
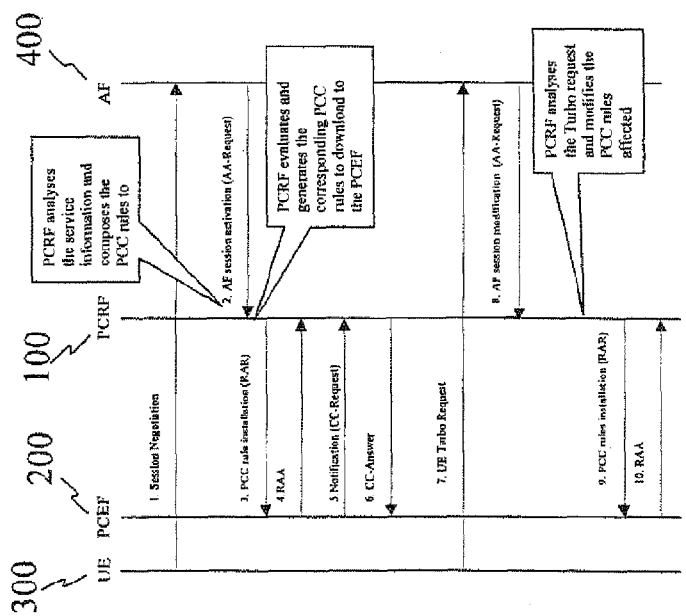
FIG. 9 illustrates a method according to an embodiment of the invention, including the activation of a turbo feature, involving the replacement of first PCC rules by second PCC rules.

FIG. 9 illustrates an embodiment of the method of the invention, including the turbo activation, i.e. the activation of the second PCC rules. The UE 300 and AF 400 negotiate the service session parameters using application level signalling, typically the US 300 negotiates the type of media and detailed parameters such as codec or rates (step "1. Session Negotiation"). Then, the AF 400 informs the PCRF 100 about the negotiated media components (step "2. AF session activation (AA-Request)"). The PCRF 100 creates the PCC rules according the information received from the AF 400 and determines the charging and policy data that applies to such PCC rules based on this information. The PCRF 100 then downloads the PCC rules to apply to the bearer, i.e. to the user plane (steps "3. PCC rule installation (RAR)", "4. RAA", "5. Notification (CC-Request)", "6. CC-Answer").

Then, the UE 300 indicates the QoS change request or turbo request using application level signalling, i.e. control plane signalling (step "7. UE Turbo Request"). The AF 400 informs the PCRF 100 about the QoS change request or turbo user request (step "8. AF session modification AA-request)"). The message on the Rx interface includes the turbo indication. The format of Rx interface should indicate such indication, for instance by the use of a field with a value or flag.

The PCRF 100 executes the corresponding evaluations to check whether the QoS change request or turbo request can be applied. In that case, it identifies the PCC rules affected, and downloads the modified PCC rules (with the new QoS and charging values) to the PCEF 200 (step "9. PCC rules installation (RAR)"). An acknowledgment is transmitted from the PCEF 200 to the PCRF 100 (step "10. RAR").

Figure 10:
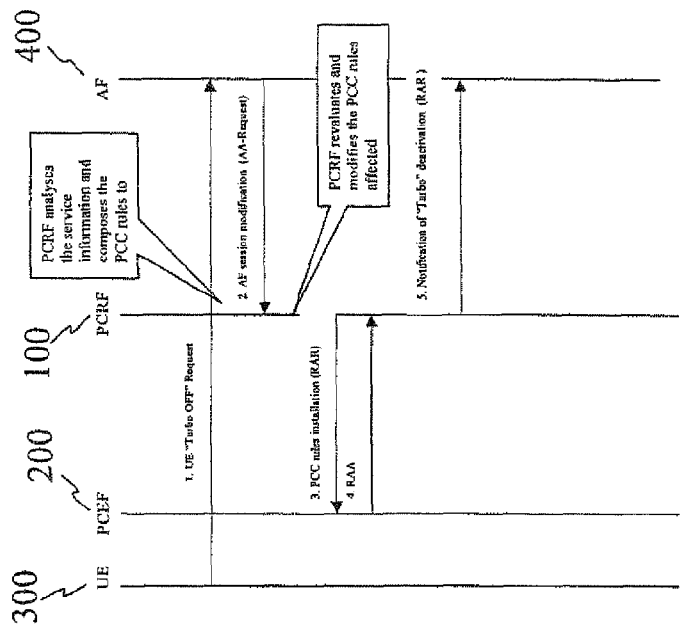
FIG. 10 illustrates a method according to an embodiment of the invention, including the deactivation of a turbo feature upon user request and involving resetting PCC rules to the first PCC rules.
Figures 11, 12:
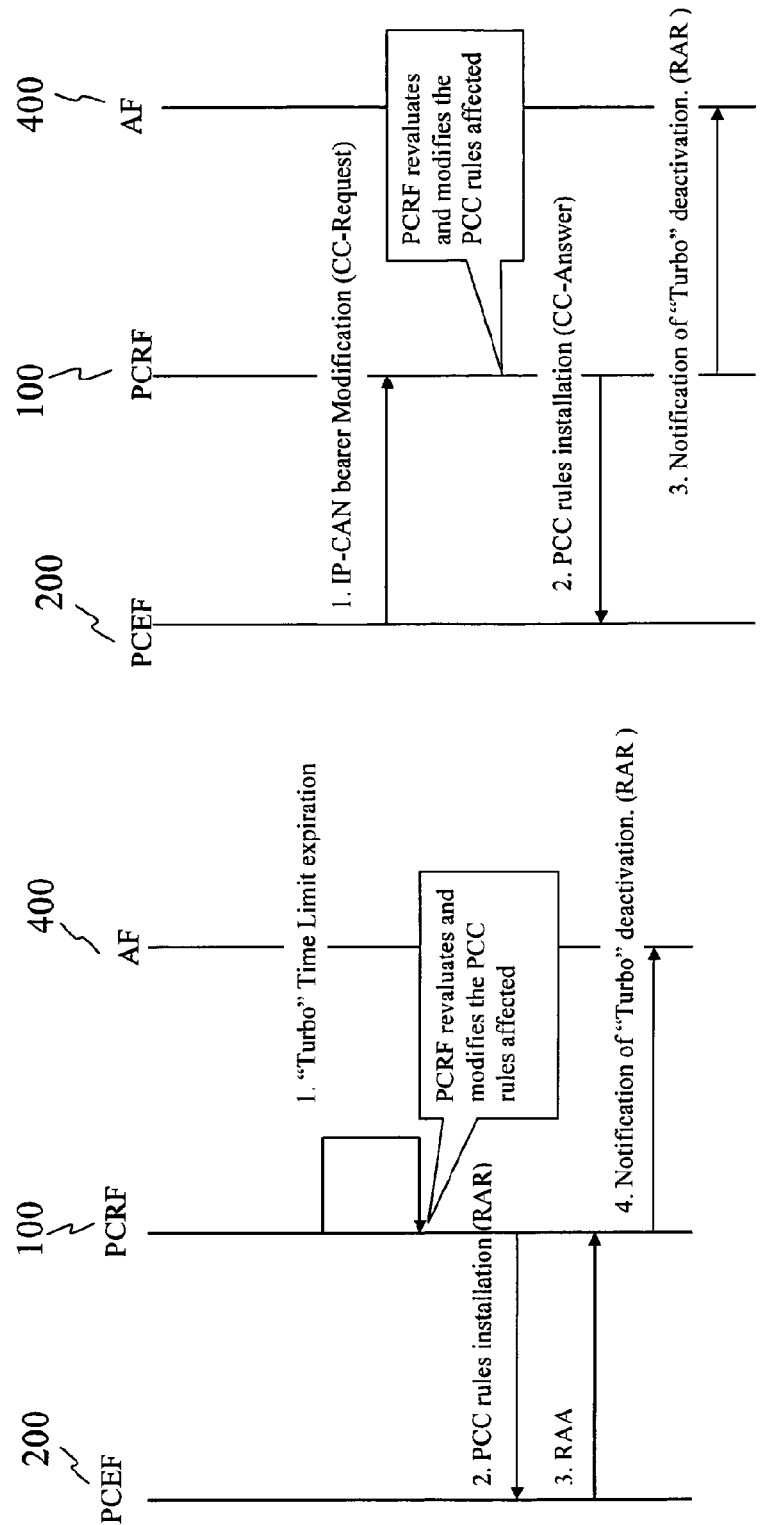
FIG. 11 illustrates a method according to an embodiment of the invention, including the deactivation of a turbo feature upon expiration of a time limit and involving resetting PCC rules to the first PCC rules.
FIG. 12 illustrates a method according to an embodiment of the invention, including the deactivation of a turbo feature due to network conditions change and involving resetting PCC rules to the first PCC rules.

FIGS. 10, 11 and 12 illustrate embodiments of the method of the invention, including the turbo deactivation, i.e. the deactivation of the second PCC rules and resetting the first PCC rules. More specifically, FIG. 10 illustrates receiving a turbo off request from the UE, FIG. 11 illustrates a turbo time limit expiration, and FIG. 12 illustrates a turbo deactivation due to network conditions change.

In other words, after the QoS change has been requested by a user, and after the corresponding second PCC rules have been enforced in the network, i.e. by the PCEF 200, different steps may take place (non-exhaustive list):

(a) The user explicitly requires to deactivate the turbo state. In other words, a command is entered through the user interface of the UE 300 to indicate this intention. One embodiment of these steps is illustrated in FIG. 10.

(b) The maximum time configured for the turbo state expires. This time limit could be configured per user and service. One embodiment of these steps is illustrated in FIG. 11.

(c) Network condition changes: e.g. roaming, radio access type change, etc. One embodiment of these steps is illustrated in FIG. 12.

In the three cases (as illustrated in FIGS. 10, 11 and 12), as well as where a change in the user profile with subscription data requires deactivation of the turbo state, the PCRF 100 reevaluates and identifies the PCC rules affected, and transfers, or downloads the modified PCC rules (with the new QoS and charging key) to the PCEF 200. The PCRF 100 may notify the new state to the AF 400 with information that the second PCC rules, or in the present case the turbo feature, has been deactivated.

Figure 13:
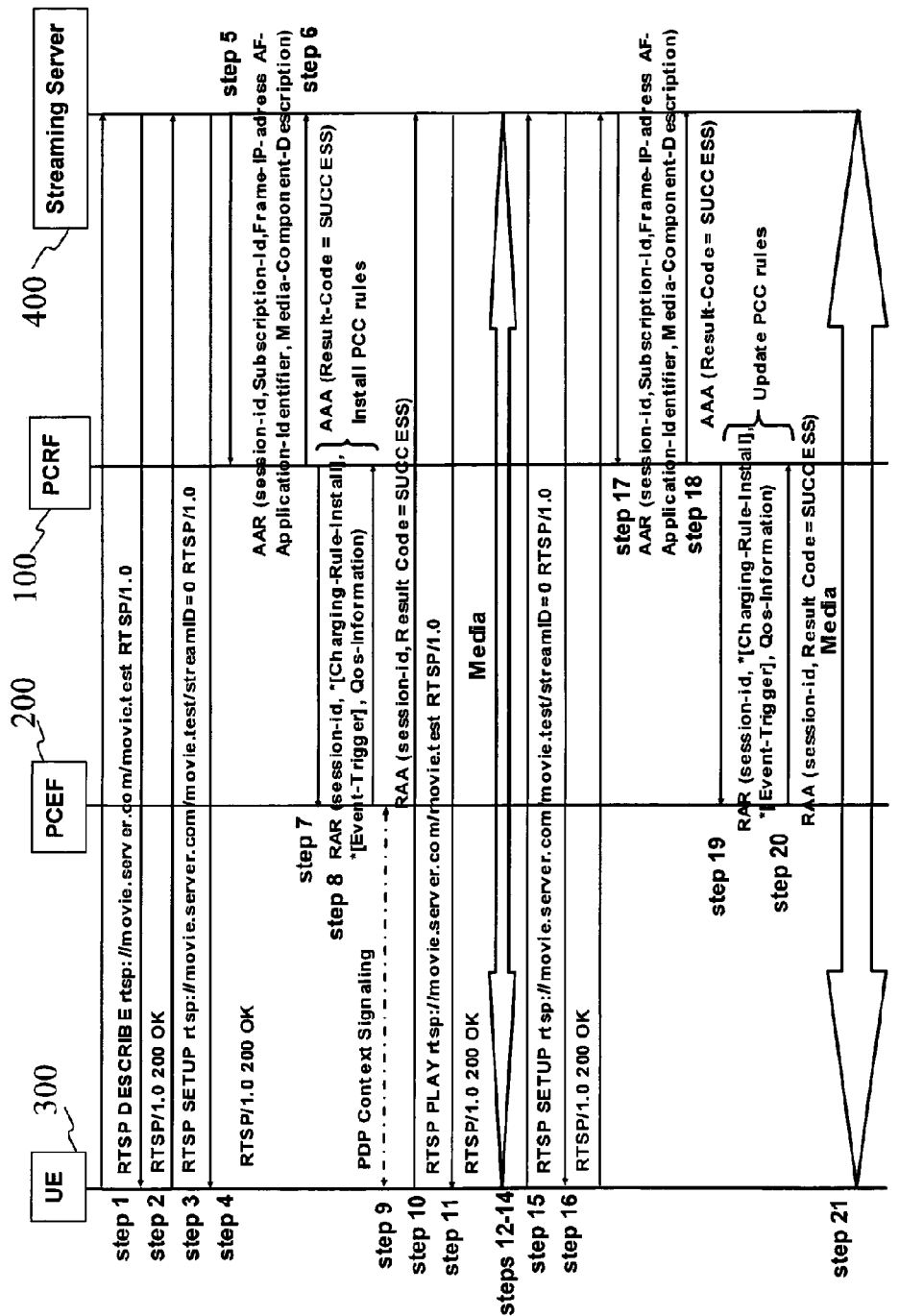
FIG. 13 illustrates an exemplary method according to an embodiment of the invention, showing a possible implementation for the session establishment and turbo activation, involving the replacement of the first PCC rules by the second PCC rules.

FIG. 13 illustrates an example of session establishment and turbo activation with reference to FIG. 13 and the following description, wherein AVP stands for Attribute Value Pair (which may for instance correspond to an information element in a Diameter message, see RFC 3588).

Step 1, A RTSP DESCRIBE command is sent to the streaming server 400 from the streaming client (the UE 300), to transmit a description of the media type. For instance:

DESCRIBE rtsp://movie.server.com/movie.test RTSP/1.0
CSeq: 1
Accept: application/sdp
Accept-Language: en-gb
User-Agent: Ericsson-SC/1.1

Step 2. A RTSP 200 OK command is returned from the streaming server 400 to the UE 300. It includes a description of the available media, may be combination of audio and video. The description of available rates is delivered. For instance:

RTSP/1.0 200 OK
CSeq: 1
Server: Ericsson-SS/1.6
Allow: OPTIONS, DESCRIBE, SETUP, PLAY, PAUSE, TEARDOWN
Content-Type: application/sdp
Content-Length: 203
v=0
O=—950814089 950814089 IN IP4 192.168.186.8
s=Example movie
i=Example of aggregate control of audio and video
a=range:npt=0-59.3478
a=control: *
t=0 0
m=audio 0 RTP/AVP 0
a=control:streamID=0
b=AS:13

Step 3. RTSP SETUP Client triggers the streaming server 400 to setup a session of specific streamID, e.g. audio, and also indicates which client port(s) to communicate to. For instance:
SETUP rtsp://movie.server.com/movie.test/streamID=0 RTSP/1.0
CSeq: 2
Transport: RTP/AVP/UDP;unicast;client_port=3456-3457

Step 4. RTSP 200 OK Server gives the session id to the client (the UE 300) and also tells which server port(s) to communicate to. For instance:
RTSP/1.0 200 OK
CSeq: 2
Transport: RTP/AVP/UDP;unicast;client_port=3456-3457; server_port=5678-5679
Session: dfhyrio90llk Step 5. The streaming server 400 sends the session information to the PCRF 100, using a AA-request (AAR). For instance:
Session ID:dfhyrio90llk
  Media-Component-Number. 1
  Media-Sub-Component
  Flow-Number. 1
Flow-Description
Direction: Out (Downlink direction. That is, from the network to the UE)
Source IP address: 192.168.186.8
Destination IP address: 144.132.134.67
Protocol: RTP
Source Ports: 5678-5679
Destination Ports: 3456-3457
Flow Status: Enable
Flow Usage:No information
Max-Requested-Bandwidth-UL. 0 (Kbps).
Max-Requested-Bandwidth-DL. 13 (Kbps)
  Flow-Number. 2
Flow-Description
Direction: Out (Downlink direction. That is, from the network to the UE)
Source IP address: 192.168.186.8
Destination IP address: 144.132.134.67
Protocol: RTCP
Source Ports: 5680-5681
Destination Ports: 3458-3459
Flow Status: Enable
Flow-Description
Direction: In (Uplink direction. That is from the UE to the network)
Source IP address: 144.132.134.67
Destination IP address: 192.168.186.8
Protocol: RTCP
Source Ports: 3457
Destination Ports: 5679
Flow Status: Enable
  AF-Application-Identifier. Streaming-ID
  Media-Type. AUDIO (0)
  RS-Bandwidth. 3.0 Kbps
  RR-Bandwidth. 3.5 Kbps Step 6. The PCRF 100 acknowledges the request, using a AA-answer (AA).

Step 7. The PCRF 100 installs, in the PCEF 200, PCC rules and QoS information. For instance:
RAR
permit out 5678-5679 from 192.168.186.8 to 1144.132.134.67: 3456-3457
permit in 3456-3457 from 144.132.134.67 to 192,168.186.8: 5678-5679
Flow-Status=ENABLED,
Max-Requested-Bandwidth-YY=25400, QCI=1

Step 8. A re-authorization answer (RAA) is sent as an acknowledgement from the PCEF 200 to the PCRF 100.

Step 9. PDP context signalling may imply the modification of an existing PDP context or the establishment of a new one. For example, if a new PDP context is established, the information corresponding to this PDP context may be: GTP Create PDP Context request with QoS values for the secondary PDP context. For instance:
Tunnel Endpoint Identifier Data I
Tunnel Endpoint Identifier Control Plane
NSAPI: 6
Linked NSAPI: 5
Quality of Service Profile: Streaming class; Delay class 1; SDU delivered in order;
Maximum bitrate 25400 UL; Maximum 25400 DL; Guaranteed bit rate 25400 UL;
Guaranteed bit rate 25400 DL
TFT: TP4=192.168.186.8, source_port={[5678 5679]}

Step 10. RTSP Play Client requesting the content. Possible the request may be:
PLAY rtsp://movie.server.com/movie.test RTSP/1.0
CSeq: 4
Session: dfhyrio90llk Step 11. RTSP OK
RTSP/1.0 200 OK
CSeq: 4
Session: dfhyrio90llk
Range: npt=0–
RTP-Info: url=rtsp://movie.server.com/movie.test/streamID=0;
seq=990009;rtptime=4470048,
url=rtsp://movie.server.com/movie.test/streamID=1;
seq=1004096;rtptime=1070549

Step 12. RTP DATA payload sent to the client (UE 300) for the requested content(s).

Step 13. RTP DATA payload sent to the client (UE 300) for the requested content(s).

Step 14. Streaming session starts to present.

Step 15. The UE 300 updates the streaming session and activates the turbo by sending a RTSP SETUP request; a new bandwidth modifier in the SDP may be used for this purpose. This turbo activation may also indicate a specific level of turbo. The RTSP SETUP Client modifies the session of specific streamID, e.g. audio, to activate the turbo. For instance:
SETUP rtsp://movie.server.com/movie.test/streamID=0 RTSP/1.0
CSeq: 2
Transport: RTP/AVP/UDP;unicast;client_port=3456-3457, b=TURBO=level-1

Step 16. RTSP 200 OK Server gives the session id to client (UE 300) and also tells which server port(s) to communicate to. For instance:
RTSP/1.0 200 OK
CSeq: 2
Transport: RTP/AVP/UDP;unicast;client_port=3456-3457;
server_port=5678-5679
Session: dfhyrio90llk- Step 17. The streaming server 400 sends the turbo indication to the PCRF 100, using a AA-request (AAR). For instance:

Session ID:dfhyrio90llk
        Media-Component-Number. 1
        Turbo=Active, level-1
        Media-Sub-Component
        Flow-Number. 1
        Flow-Number. 2
        AF-Application-Identifier. Streaming-ID Step 18. The PCRF 100 acknowledges the turbo request or QoS change request, using a AA-answer (AAA).

Step 19. The PCRF 100 executes the corresponding evaluation to check if the turbo request is possible. In that case, it identifies the PCC rules affected, and downloads the new Qos and charging values to the PCEF 200. For instance:

RAR              QoS-Information:Max-Requested-Bandwidth=50000 (Note: This is the new bandwidth value calculated by the PCRF according to the turbo request. Note that previous bandwidth value was 25400).

Step 20. The PCEF 200 answers with a re-authorization answer (RAA).

Step 21. RTP DATA payload sent to the client (UE 300) for the requested content(s), the minimum bite rate (MBR) is increased.

Figure 14:
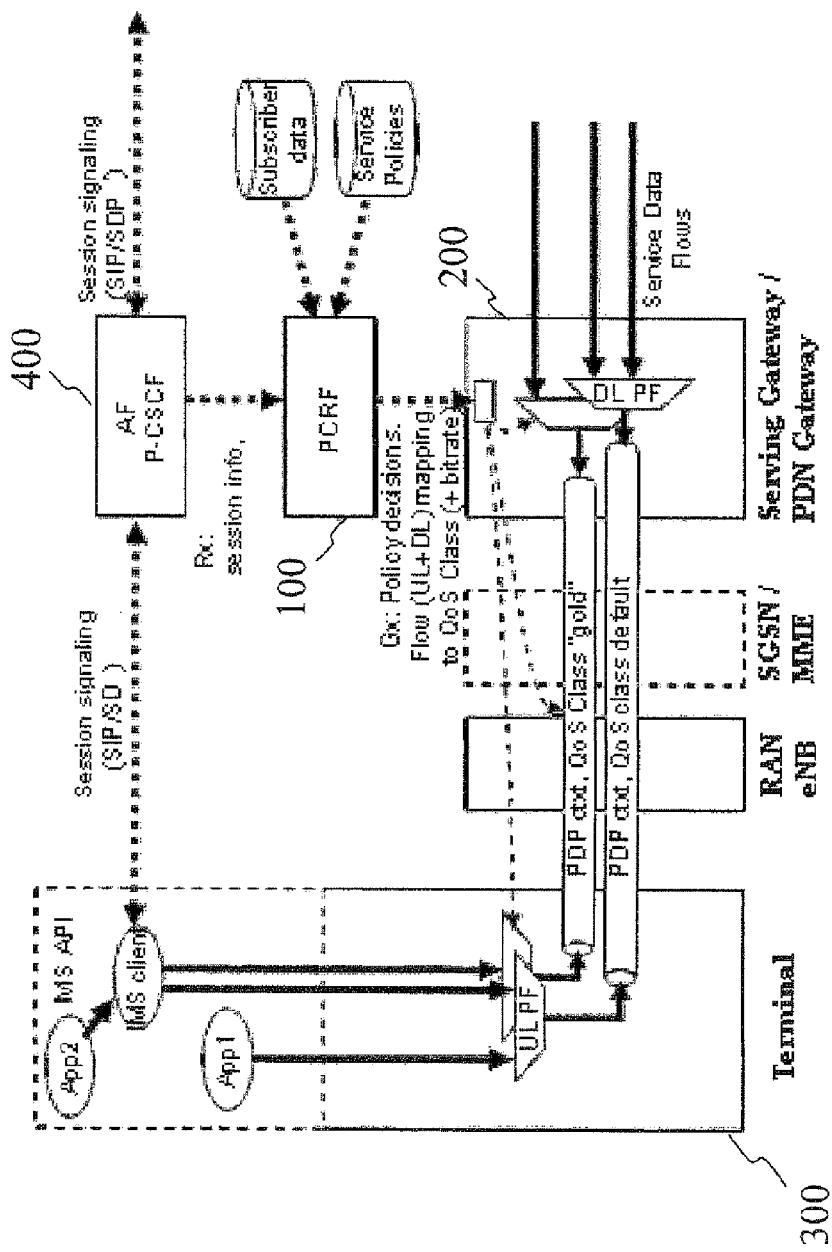
FIG. 14 illustrates a PCC architecture and implementation, according to an embodiment of the invention.

FIG. 14 illustrates an architecture and implementation, where a mobile communication (e.g. 3GPP) network with the new feature of network-initiated QoS, is controlled by the PCRF 100 to provide a certain QoS class to a given flow. The impacts on the PCRF 100 are as follows. PCRF is able to or configured to evaluate the QoS change request or turbo request, to determine whether it is possible to attend this request, to identify the service or services affected, to recalculate the PCC rules with the new QoS and charging keys, and to install the second PCC rules in the PCEF 200.

The table of FIG. 15 shows an example of the QoS profiles assigned for the different services assigned to the subscriber group "Gold" before the turbo is activated ("Normal Conditions") and when the turbo is on ("Turbo Conditions"). MBR stands for minimum bite rate and GBR stands for guaranteed bit rate. WeShare refers to Ericsson's IP Multimedia Subsystem (IMS) implementation of combinational services (combining both voice and other media). A user with a WeShare-compliant terminal can share video, images, and other media when carrying out a voice call.

The impacts on the Rx interface may be described as follows. In particular, the impacts on the AA-request may be described as follows:

The AA-request (AAR) sent by the AF 400 to the PCRF 100 includes an AVP to indicate the turbo state or QoS change state. The valid values for this AVP may be "On"/"Off", although it may be extended to include new values, for example to indicate different levels of turbo or requested QoS.

This AVP may be included in the Media-Component-Description AVP, in order to provide turbo request at media level. This addresses the case wherein the user wants to increment the quality assigned to a specific media of the service, e.g. video.

The description at media-component level has higher priority than the service session level one.

The following is an example of message format which may be used for the AA-Request sent from the AF 400 to the PCRF 100:

```
<AA-Request> ::= < Diameter Header: 265, REQ, PXY >
                 < Session-Id >
                 { Auth-Application-Id }
                 { Origin-Host }
                 { Origin-Realm }
                 { Destination-Realm }
                 *[ Media-Component-Description ]
                     Modified AVP (see below)
             [Turbo] New AVP
                 *[ Flow-Grouping ]
                 [ AF-Charging-Identifier ]
                 [ SIP-Forking-Indication ]
                 *[ Specific-Action ]
                 *[ Subscription-ID ]
                 *[ Proxy-Info ]
                 *[ Route-Record ]
                 *[ AVP ]
Media-Component-Description ::= < AVP Header: 517 >
             { Media-Component-Number } ;
                 Ordinal number of the media component.
             [Turbo] New AVP
             *[ Media-Sub-Component ] ;
                 Set of flows for one flow identifier
             [ AF-Application-Identifier ]
             [ Media-Type ]
             [ Max-Requested-Bandwidth-UL ]
             [ Max-Requested-Bandwidth-DL ]
             [ Flow-Status ]
             [ RS-Bandwidth ]
             [ RR-Bandwidth ]
```

The impacts on the session negotiation protocols may be described as follows. The session negotiation protocol between the two end-points should be extended.

In the case of session description protocol (SDP) for session initiation protocol (SIP) services, this can be added by defining a new modifier as described in RFC 3556 "Session Description Protocol (SDP) Bandwidth Modifiers for RTP Control Protocol (RTCP) Bandwidth".

The session description protocol (SDP) includes an optional bandwidth attribute with the following syntax:

b=<modifier>:<bandwidth-value> where <modifier> is a single alphanumeric word giving the meaning of the bandwidth figure. This may be extended by defining new modifiers to indicate the turbo situation and/or the level of turbo required.

The mobile device or UE 300 shown on FIG. 8b incorporates an application to provide a display menu through which the user can activate the turbo feature. The display allows to indicate turbo per application, or per session and also the level of turbo if required. Once the user activates the turbo, the terminal (or UE 300) application generates the corresponding signalling towards the network node as described for instance with reference to FIG. 13.

The physical entities according to the invention, including the servers may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms "creating unit", "triggering unit", "deciding unit", "receiving unit", "installing unit", "initiating unit" and "resetting unit" are used herewith, no restriction is made regarding how distributed these elements may be and regarding how gathered elements may be. That is, the constituent elements of a unit may be distributed in different software or hardware components or devices for bringing about the intended function. A plurality of distinct elements may also be gathered for providing the intended functionalities.

Any one of the above-referred units of a server, or a network node, may be implemented in hardware, software, field-programmable gate array (FPGA), application-specific integrated circuit (ASICs), firmware or the like.

In further embodiments of the invention, any one of the above-mentioned and/or claimed creating unit, triggering unit, deciding unit, receiving unit, installing unit, initiating unit and resetting unit is replaced by creating means, triggering means, deciding means, receiving means, installing means, initiating means and resetting means respectively, or by a creator, triggerer, decider, receiver, installer, initiater and resetter respectively, for performing the functions of the creating unit, triggering unit, deciding unit, receiving unit, installing unit, initiating unit and resetting unit.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A policy and charging control method carried out by a network node including an application function (AF), by a first server including a policy and charging rules function (PCRF), by a second server including a policy and charging enforcement function (PCEF), and by a user equipment (UE) configured to interact with the network node, the method comprising:
    creating, by the PCRF, first policy and charging control (PCC) rules based on session information negotiated between the UE and the AF;
    installing, at the PCEF and at establishment of a user plane session associated with the UE, the first PCC rules;
    initiating, at the PCEF, a service associated with the UE in accordance with the first PCC rules, the service involving a plurality of media;
    after the service has been initiated but during the lifetime of the user plane session:
        transmitting, by the UE to the network node, a quality-of-service (QoS) change request on a per-media basis upon activation of a user interface command on the UE, the user interface command indicating a desire by a user of the UE to obtain a QoS change, and the QoS change request being specific to a particular media of the service involving a plurality of media;
        creating, by the PCRF, second PCC rules based on the QoS change request on a per-media basis;
        installing, at the PCEF, the second PCC rules by replacing the first PCC rules by the second PCC rules; and
        continuing, at the PCEF, the service associated with the UE in accordance with the second PCC rules; and
    resetting the second PCC rules applied to the user plane session back to the first PCC rules when at least one of the following occurs:
        a duration lapses or expires after the step of installing the second PCC rules at the PCEF;
        a request for resetting the QoS applied to the user plane session is transmitted from the UE;
        a particular time of the day or week is reached;
        a user profile changes; and an event in the user plane invalidates the modified second PCC rules.

2. The method of claim 1, wherein the activation of the user interface command on the UE is an activation of a turbo button.

3. The method of claim 1, wherein the QoS change request is at least one of
    a request for a change in QoS category, level or grade associated with the user plane session,
    a request for a change in the resources associated with the user plane session,
    a request for a change in the guaranteed performance associated with the user plane session, and
    a request for a change in the bandwidth associated with the user plane session.

4. The method of claim 1, further including, between transmitting the QoS change request and creating the second PCC rules based on the QoS change request, deciding at least one of:
    whether the QoS change request can be applied to the user plane session; and
    to which degree or extent the QoS change request can be applied to the user plane session.

5. The method of claim 4, wherein deciding includes deciding based on at least one of access network conditions, roaming conditions, radio access type, congestion level, time and user profile.

6. The method of claim 1, wherein installing, at the PCEF, the second PCC rules by replacing the first PCC rules includes assigning a new charging key to the service associated with the UE.

7. A server configured for implementing a policy and charging rules function (PCRF), the server comprising:
    a processor; and
    a memory containing instructions that, when executed by the processor, cause the server to:
        create first policy and charging control (PCC) rules based on session information negotiated between a user equipment (UE) and an application function (AF);
        trigger the installation, at establishment of a user plane session associated with the UE, the first PCC rules at a server configured for implementing a policy and charging enforcement function (PCEF),
        initiate a service associated with the UE in accordance with the first PCC rules, the service involving a plurality of media;
        receive, after the service has been initiated but during the lifetime of the user plane session, a quality-of-service (QoS) change request on a per-media basis originated from the UE, the QoS change request being specific to a particular media of the service involving a plurality of media and indicating a desire by a user of the UE to obtain a QoS change;
        create, during the lifetime of the user plane session, second PCC rules based on the QoS change request on a per-media basis;
        trigger the installation, during the lifetime of the user plane session, at the server configured for implementing the PCEF, of the second PCC rules by replacing the first PCC rules by the second PCC rules, so that the server configured for implementing the PCEF can continue the service associated with the UE in accordance with the second PCC rules; and
        reset the second PCC rules applied to the user plane session back to the first PCC rules when at least one of the following occurs:

a duration lapses or expires after the step of installing the second PCC rules at the PCEF;
a request for resetting the QoS applied to the user plane session is transmitted from the UE;
a particular time of the day or week is reached;
a user profile changes; and
an event in the user plane invalidates the modified second PCC rules.

8. The server of claim 7, wherein the instructions, when executed by the processor, further cause the server to determine at least one of:
whether the QoS change request can be applied to the user plane session; and
to which degree or extent the QoS change request can be applied to the user plane session.

9. The server of claim 8, wherein the determination is based on at least one of access network conditions, roaming conditions, radio access type, congestion level, time and user profile.

10. A non-transitory computer readable storage medium including computer program instructions embedded thereon that, when executed by a microprocessor on a first server configured for implementing a policy and charging rules function (PCRF), cause the first server to:
create first policy and charging control (PCC) rules based on session information negotiated between a user equipment (UE) and an application function (AF);
trigger the installation, at establishment of a user plane session associated with the UE, of the first PCC rules at a second server configured for an implementing policy and charging enforcement function (PCEF);
initiate a service associated with the UE in accordance with the first PCC rules, the service involving a plurality of media; and
after the service has been initiated but during the lifetime of the user plane session:
receive, from the UE, a quality-of-service (QoS) change request on a per-media basis, the QoS change request being specific to a particular media of the service involving a plurality of media and indicating a desire by a user of the UE to obtain a QoS change;
create second PCC rules based on the QoS change request on a per-media basis;
trigger the installation, at the second server configured for implementing the PCEF, the second PCC rules by replacing the first PCC rules by the second PCC rules, so that the server configured for implementing the PCEF can continue the service associated with the UE in accordance with the second PCC rules; and
reset the second PCC rules applied to the user plane session back to the first PCC rules when at least one of the following occurs:
a duration lapses or expires after the step of installing the second PCC rules at the PCEF;
a request for resetting the QoS applied to the user plane session is transmitted from the UE;
a particular time of the day or week is reached;
a user profile changes; and
an event in the user plane invalidates the modified second PCC rules.

\* \* \* \* \*

UNITED STATES PATENT AND TRADEMARK OFFICE
CERTIFICATE OF CORRECTION

PATENT NO. : 9,294,902 B2
APPLICATION NO. : 13/126554
DATED : March 22, 2016
INVENTOR(S) : Castro-Castro et al.

It is certified that error appears in the above-identified patent and that said Letters Patent is hereby corrected as shown below:

On Title Page 2, in item (56), under "OTHER PUBLICATIONS", in Column 2, Line 8, delete "Requiremnts" and insert -- Requirements --, therefor.

In the Specification

In Column 2, Line 3, delete "session;" and insert -- session: --, therefor.

In Column 2, Line 8, delete "FCC" and insert -- PCC --, therefor.

In Column 2, Line 10, delete "FCC" and insert -- PCC --, therefor.

In Column 2, Line 15, delete "FCC" and insert -- PCC --, therefor.

In Column 2, Line 62, delete "basic" and insert -- Basic --, therefor.

In Column 3, Line 44, delete "Diffsery" and insert -- Diffserv --, therefor.

In Column 3, Line 49, delete ""universal" and insert -- "Universal --, therefor.

In Column 9, Line 32, delete "installing unit 200" and insert -- installing unit 204 --, therefor.

In Column 9, Line 67, delete "Ts" and insert -- TS --, therefor.

In Column 13, Line 44, delete "US 300" and insert -- UE 300 --, therefor.

In Column 13, Line 59, delete "AA-request)")." and insert -- AA-request"). --, therefor.

In Column 14, Line 38, delete "Step 1," and insert -- Step 1. --, therefor.

Signed and Sealed this
Seventh Day of June, 2016

Michelle K. Lee
*Director of the United States Patent and Trademark Office*

CERTIFICATE OF CORRECTION (continued)
U.S. Pat. No. 9,294,902 B2

In Column 15, Line 20, delete "a AA-request" and insert -- an AA-request --, therefor.

In Column 15, Lines 61-62, delete "a AA-answer" and insert -- an AA-answer --, therefor.

In Column 15, Line 67, delete "1144." and insert -- 144. --, therefor.

In Column 16, Line 2, delete "192," and insert -- 192. --, therefor.

In Column 16, Line 23, delete "TP4=" and insert -- IP4= --, therefor.

In Column 16, Line 37, delete "seq=990009;" and insert -- seq=9900093; --, therefor.

In Column 17, Line 2, delete "a AA-request" and insert -- an AA-request --, therefor.

In Column 17, Line 12, delete "a AA-answer" and insert -- an AA-answer --, therefor.

In Column 19, Line 13, delete "initiater" and insert -- initiator --, therefor.

In the Claims

In Column 20, Line 7, in Claim 3, delete "one of" and insert -- one of: --, therefor.